United States Patent [19]

Grüner et al.

[11] Patent Number: 5,065,341

[45] Date of Patent: Nov. 12, 1991

[54] PRINTER FOR A COMPUTER

[75] Inventors: Manfred Grüner; Heiko Kunze, both of Ulm, Fed. Rep. of Germany

[73] Assignee: Mannesmann AG, Düsseldorf, Fed. Rep. of Germany

[21] Appl. No.: 385,857

[22] Filed: Jul. 26, 1989

[30] Foreign Application Priority Data

Jul. 26, 1988 [EP] European Pat. Off. ........ 88730167.9

[51] Int. Cl.⁵ .................................................. G06F 15/40
[52] U.S. Cl. ..................................... 364/516; 364/174
[58] Field of Search ............... 364/516, 174, 519, 173; 318/561, 567, 603, 635, 685, 696

[56] References Cited

U.S. PATENT DOCUMENTS

| | | | |
|---|---|---|---|
| 3,798,430 | 3/1974 | Simon et al. | 364/174 |
| 4,021,650 | 5/1977 | Ruble | 364/174 |
| 4,146,922 | 3/1979 | Brown et al. | 364/174 |
| 4,353,262 | 10/1982 | Talbot | 74/108 |
| 4,387,642 | 6/1983 | Bringhurst et al. | 101/93.04 |
| 4,459,675 | 7/1984 | Bateson et al. | 364/174 |
| 4,460,968 | 7/1984 | Cavill et al. | 364/174 |
| 4,461,984 | 7/1984 | Whitaker et al. | 318/687 |
| 4,463,435 | 7/1984 | Cavill | 364/174 |
| 4,591,280 | 5/1986 | Bringhurst | 400/124 |
| 4,650,358 | 3/1987 | Lohrmann et al. | 400/616.2 |
| 4,764,040 | 8/1988 | Whitaker | 400/320 |
| 4,775,945 | 10/1988 | Cavill et al. | 364/174 |
| 4,777,609 | 10/1988 | Cavill et al. | 364/519 |
| 4,818,127 | 4/1989 | Babsch et al. | 400/121 |
| 4,897,778 | 1/1990 | Miyamoto et al. | 364/174 |

Primary Examiner—Parshotam S. Lall
Assistant Examiner—Ellis B. Ramirez
Attorney, Agent, or Firm—Nils H. Ljungman & Associates

[57] ABSTRACT

An apparatus to regulate the speed of pulse width modulated electric motors 1 has a coder 3 on the shaft 2, the signals from which are used as feedback signals in the regulation circuit, and are transmitted to a regulator 4 with a microprocessor 5, from the output control lines 6, 7 to an amplifier 8, and the amplifier 8 feeds the electric motor 1.

To reduce the quantity of hardware components of the regulator 4, and in particular to save time in the CPU even at relatively low setpoint speeds, and to achieve a more rapid and more precise regulation overall, the invention proposes that the regulator 4 comprises a microprocessor 5 connected to the coder 3, wherein the microprocessor 5 is connected by means of a data and address bus 9 to a peripheral control component 10, and that the microprocessor 5 can be loaded by means of the data and address bus 9 with programs 11 for regulating the "off" time of the pulse curve.

20 Claims, 5 Drawing Sheets

PRINTER FOR A COMPUTER

BACKGROUND OF THE INVENTION

1. Field of the Invention

This invention relates to a printer for a computer and, more specifically, to a printer which employs a printing element which is movable by means of an electric motor. The apparatus of the present invention includes a coder which monitors the rotation of the motor and provides feedback signals to a microprocessor controlled regulator. Output control lines, from the regulator, are connected to an amplifier which, in turn, supplies power to the motor which is regulated by the regulator. The apparatus of the present invention provides precise control of the motor and associated printing element.

2. Description of the Prior Art

The prior art includes a regulation apparatus for the precise regulation of the speed of rotation of a motor, such as that used in of a dot-matrix printer motor. An actual value counter, which has been programmed with a setpoint, counts pulses and, upon reaching the setpoint count, causes a first auxiliary signal to be generated as a function of the pulse edges of the beginning of a period duration. The basis used here is only a regulation algorithm.

In another process of the prior art, the object is high sensitivity with minimum error, a fast reaction time and a rapid adjustment time with a minimum of fluctuations. This process uses a hardware-based digital control solution.

In another process of the prior art which is employed to regulate the speed of separately excited motors, the motor armature is fed current pulses and, during the pulse interval, the rheostatic armature voltage is measured, compared to a setpoint and the result of the comparison is used to trigger another subsequent direct current pulse. This regulation system is exclusively hardware-based and, in particular, an analog-digital system.

All of these proposals of the prior art, without exception, are based on a hardware-oriented regulation of motor voltage. These are inflexible systems which allow only a regulation algorithm. At the same time, the solutions of the prior art require a high expenditure for hardware components.

OBJECT OF THE INVENTION

An abject of the present invention is to save time in a central processing unit (CPU) of a computer which controls a motor, and which is effective even for relatively slow desired speeds, e.g. those which occur when components are being accelerated or decelerated, such as print head slides in dot-matrix printers, and thereby achieve a regulation which is more rapid and more precise than those of the prior art.

SUMMARY OF THE INVENTION

The above object is achieved by an apparatus to regulate the speed of pulse width modulated electric alternating current or direct current motors according to the invention, in that the regulator includes a microprocessor, which receives feedback data from a coder. The microprocessor is connected by means of a data and address bus to a peripheral control unit (PCU). The microprocessor can receive data from a data and address bus which programs the microprocessor for the regulation of the "off" time of the pulse curve. The invention guarantees a variable regulation. The peripheral control unit also makes possible a higher pulsation frequency of the motor voltage and thus a reduced ripple of the motor current. Thereby slower setpoint speeds (e.g. for dot-matrix printers) can be regulated with greater precision. However, the combination of the hardware (CPU, PCU) with software (programs for regulating the "off" time of the pulse) is of particular advantage, because the software need no longer assume responsibility for timing the motor voltage, and time is therefore saved for more precise calculations of the control variables. The present invention makes it possible to achieve extremely low ripples for a current which is, basically, of a sawtooth pattern, and therefore exhibits practically direct-current behavior.

In one configuration of the invention, the peripheral control unit is a binary cycle time counter, a cycle time register and a cycle time comparator, whereby an output signal can be generated by a control logic when the defined counter status is achieved. On account of this hardware support, the software does not turn the motor voltage on and off. The computer time thereby made available improves the quality of the regulation.

A further improvement provided by the invention is that a toggle flip-flop in the control logic activates the alternating current or direct current motor with a reversing current flow, the frequency of which is in the audible range, so that the motor operates as an acoustical signalling device. The motor is not moving during this process. This frequency is set by means of the software and, consequently, the desired sequences of tones can be produced with minimal programming.

In one embodiment of the invention, the polarity of the output signal can be reversed by means of a motor control register, i.e. a reverse current flow can be applied to the motor, and the motor voltage can be timed to influence the deceleration of the motor in a controllable ratio. The deceleration of the motor can thereby be adjusted with minimal programming effort and expense to the conditions at hand, such as braking distance, inertia, temperature and other factors.

In summing up, one aspect of the invention resides broadly in a microprocessor computer control for a printer such as a printer for a personal computer or the like. The microprocessor computer control is for regulating the speed of pulse width modulated electric motors, in particular of direct current motors. The microprocessor computer control comprises a coder on the motor for providing signals which are used as feedback signals in a regulation circuit and are transmitted to a regulator with a microprocessor. Output control lines to an amplifier feeds the electric motor. The regulator comprises a microprocessor connected to the coder. The microprocessor is connected by a data and address bus to a peripheral control component. The microprocessor is loaded by the data and address bus with programs for regulating the "off" time of the pulse curve.

BRIEF DESCRIPTION OF THE DRAWINGS

The following Description of the Preferred Embodiments may be better understood if taken with respect to the appended drawings in which.

DESCRIPTION OF THE PREFERRED EMBODIMENTS

Figure 1:
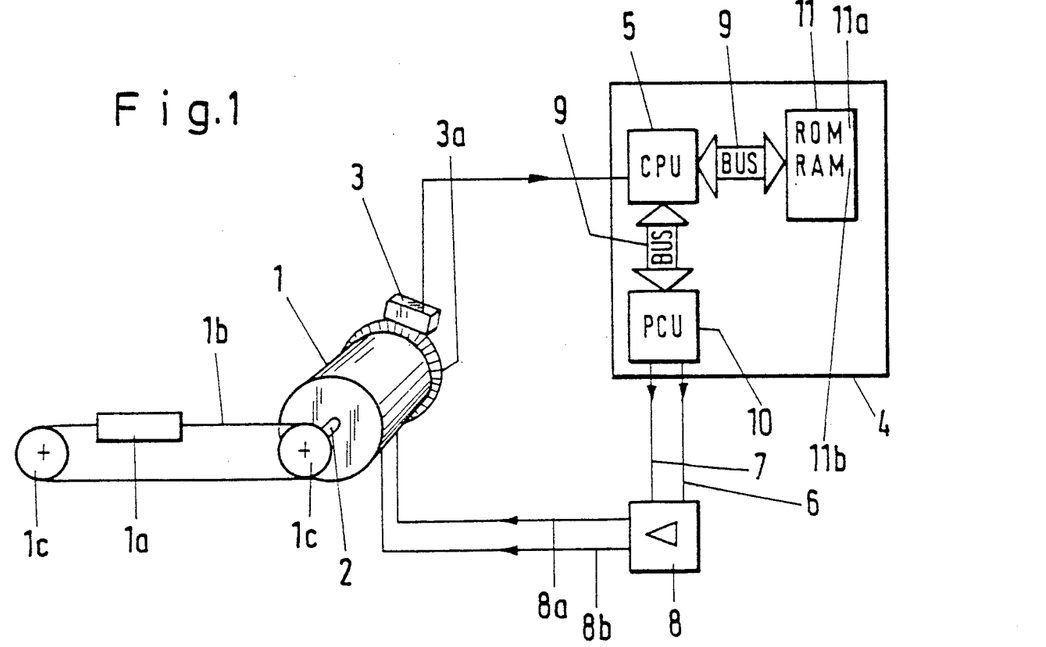
FIG. 1 is a schematic diagram of the present invention.

Pulse modulated electric motor 1, by means of one of the two shaft stumps, drives on shaft 2 a load which consists of print head slide 1a, e.g. of a dot matrix printer, which is moved back and forth by means of a cable 1b and pulleys 1c. The disturbances which occur due to ambient or existing conditions are eliminated by means of regulation apparatus 4 of the invention. On the opposite side of electric motor 1, shaft 2 has a coder 3, whose signals are used as feedback signals in regulation apparatus 4, and are conducted to regulation apparatus 4 with microprocessor 5. They are then conducted from output control lines 6 and 7. MH1 corresponds to horizontal motor movement in a first direction of rotation while MH2 corresponds to horizontal motor movement in a second direction of rotation. From lines 6 and 7, the signals go to amplifier 8 and amplifier 8 transmits power to drive electric motor 1 by means of lines 8a and 8b.

Coder 3 generates the cycle of the actual speed of rotation by means of a slotted disc 3a with optical-electronic sampling on motor shaft 2. One slot corresponds to the horizontal distance of about 1/120" on print head 1a. Coder 3, thus, provides feedback in the regulation circuit. The task of regulator, or regulation circuit or apparatus, 4 is to operate electric motor 1 at a constant speed. Amplifier 8 supplies the necessary power for this purpose. Moments of inertia, e.g. of the slide 1a, generally represent constant loads and do not cause any disturbances. Variable loads, however, are caused by varying coefficients of friction, in particular. Variable temperatures also change the inertial characteristics of electric motor 1.

Regulator 4 consists of a hardware electronic part and a software part. The hardware consists of registers, counters and comparator circuits and of the above-mentioned clock pulse generation for feedback in the regulation circuit.

The software from ROM/RAM 11, in connection with the required components which include microprocessor 5, data bus 9, a ROM 11a, a RAM 11b, loads the register described below and the values in this register are a function of the specified speed, control algorithms and mechanical constants.

Figure 2:
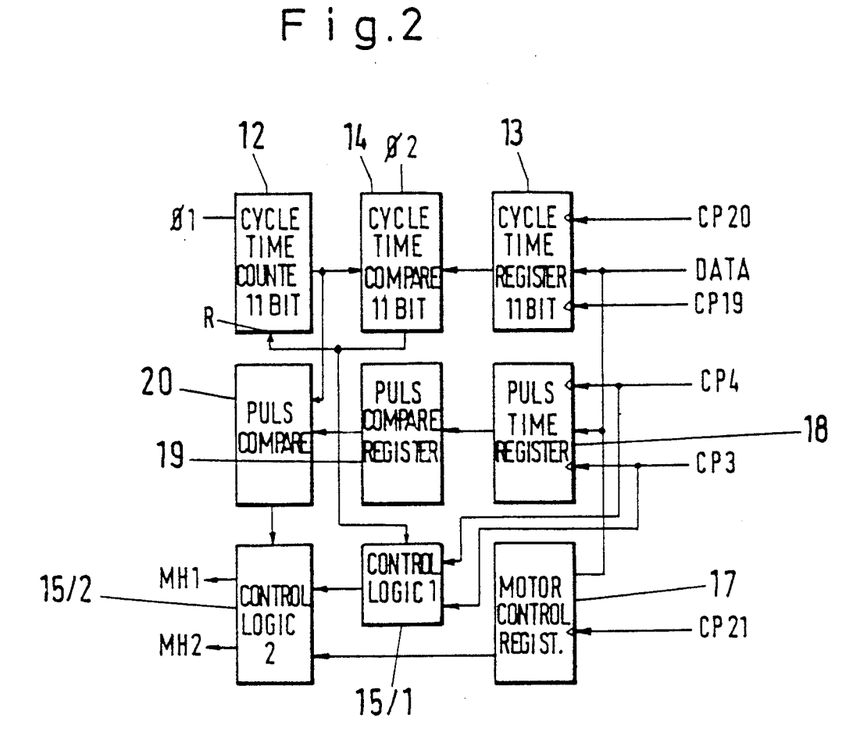
FIG. 2 is a block diagram of the peripheral control unit.
Figure 3:
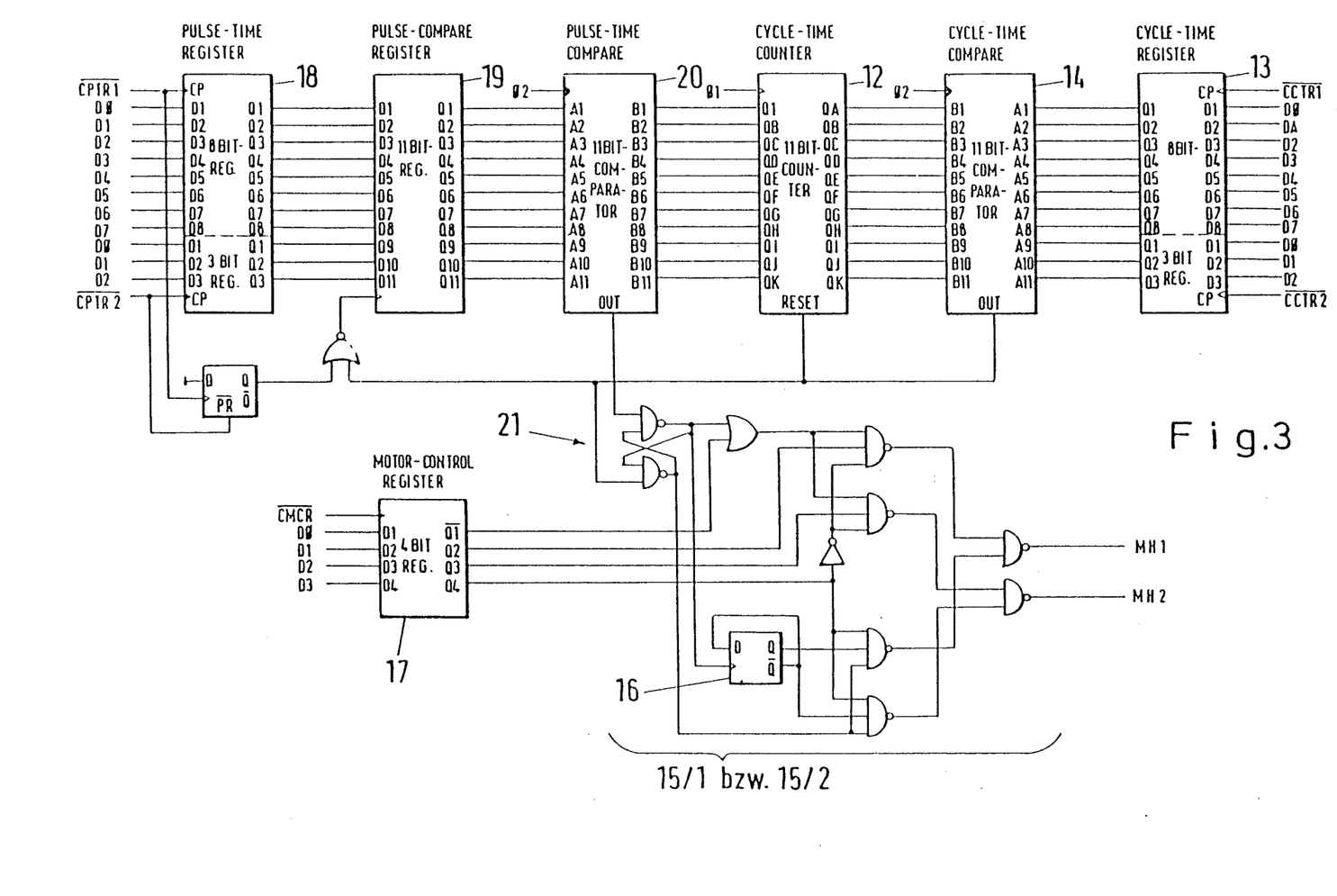
FIG. 3 is a wiring diagram of the circuit of FIG. 2.

A portion of peripheral control component 10 is shown in greater detail in FIG. 2. As can be seen from FIG. 2, the hardware consists of several functional components which, on one hand, produce the period duration and, on the other hand, the pulse width and activate or deactivate the output signals as a function of the direction of rotation (MH1, MH2).

Cycle time counter 12, cycle time register 13 and cycle time comparator 14 produce the period, T, duration. Cycle time register 13 is loaded with data by an 11-bit and an 8-bit data bus. Clock pulse signal Phi 1 ($\phi$1) increments cycle time counter 12 at a frequency of 1 MHz, for example, until counter 12 has the same value as cycle time register 13. When counter 12 and register 13 reach the same value, cycle time comparator 14 sends out a signal which, corresponding to clock pulse signal Phi 2 ($\phi$2) which has a phase shift of 180°, resets flip-flop 21 which causes the selected output signal (control logic 15/2) to be set to logical zero.

Pulse time register 18, pulse comparison register 19 and a pulse comparator 20 are provided to generate the pulse or pause signal. The length of the pause signal is recorded in pulse time register 18, and the pulse time register 18 is loaded with two cycles like the cycle time register 13. This value is transmitted at the beginning of each period, T, to the pulse comparison register 19 (control logic 15/1), so that no false pulse widths will be recorded. When the contents of the cycle time counter 12 equal the contents of pulse comparison register 19, pulse time comparator 20 causes pulse flip-flop 21 to be set, which causes the selected output signal (control logic 15/2) to be set to logical one.

Motor control register 17 consists of four bits and generates output signals MH1 and MH2 as shown in the following table:

| | | Motor Control Register 17: | | | |
|---|---|---|---|---|---|
| Bit 1 | Bit 2 | Bit 3 | Bit 4 | MH1 | MH2 |
| 0 | 0 | 0 | 0 | 0 | 0 |
| 1 | 0 | 0 | 0 | 1 | 0 |
| 0 | 1 | 0 | 0 | 0 | 1 |
| 1 | 1 | 0 | 0 | 1 | 1 |
| 0 | 0 | 1 | 0 | 0 | 0 |
| 1 | 0 | 1 | 0 | ⎍⎍ | 0 |
| 0 | 1 | 1 | 0 | 0 | ⎍⎍ |
| 1 | 1 | 1 | 0 | ⎍⎍ | ⎍⎍ |
| X | X | X | 1 | Toggle | Toggle |

Toggle flip-flop 16 in control logic 15/2 provides an additional function, which controls electric motor 1, in particular a direct current motor, with a reverse current flow. The frequency of such current lies in the audible range and can be used as an acoustical signalling device, without rotation of the motor.

Figure 4:
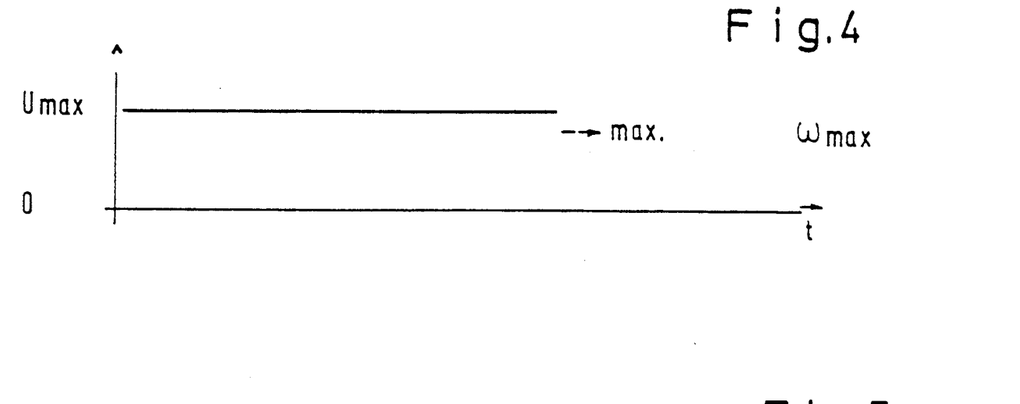
FIG. 4 is a graph of an unmodulated motor voltage.

The regulation system provided by the present invention is a pulse width modulated system. Pulse width regulation, generally, makes it possible to vary the average value of the voltage from Umax to zero. The speed of electric motor 1, which is operated with pulsed voltage U, is changed accordingly. As shown in FIG. 4, the maximum speed of electric motor 1 at the maximum voltage, Umax, is represented as a horizontal time line.

Figure 5:
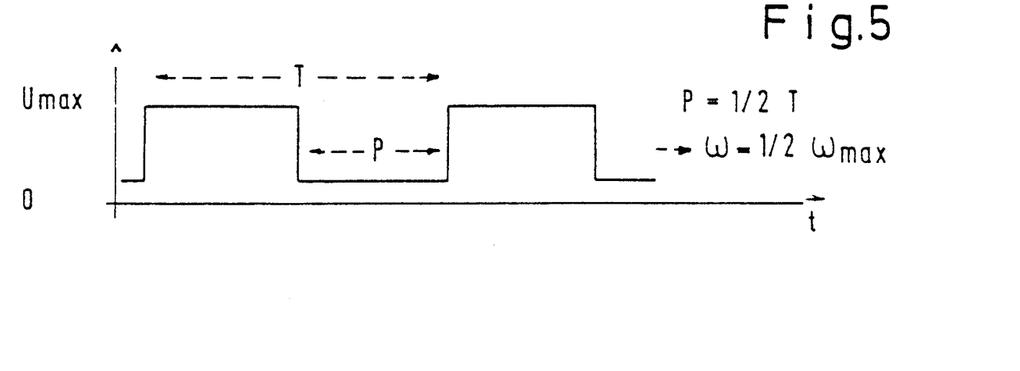
FIG. 5 is a graph of a pulse modulated signal.

FIG. 5 shows a pulsed maximum voltage Umax with a cycle time T and a pause which equals ½ T. Accordingly, the speed, omega ($\omega$) equals ½ omega max, under otherwise identical conditions.

Figure 6:
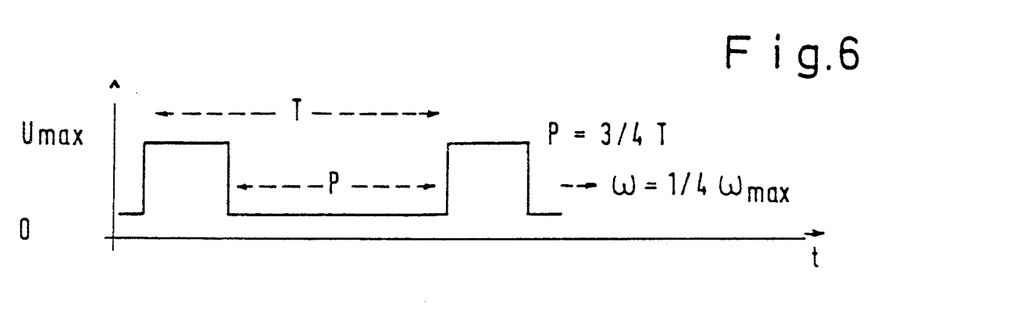
FIG. 6 is a graph of a modified pulse modulated signal.

FIG. 6 shows a pulse diagram with a cycle time T, with pause time P equal to ¾T, so that the speed, omega, equals ¼ omega max, otherwise identical conditions.

Cycle time T corresponds to the contents of cycle register 13. Pause time P corresponds to the contents of the pulse time register 18. In both registers, the time is specified at a frequency of ϕ1 equal to 1 MHz.

This embodiment of the present invention relates to a regulation apparatus for a matrix pin printer. For this case, the conditions are as follows. The regulation apparatus regulates the speed to a preset speed between 200 microseconds and 3000 microseconds per 1/120 inches, which is the interval between slots on coder 3. This required speed must be achieved within a specified, acceleration distance. On the other hand, deceleration from the specified speed must also occur within a specified, deceleration distance.

The software routines and programs must, therefore, provide data to the registers according to the requirements of motor control register 17, cycle time register 13 and pulse time register 18. Motor control register 17, theoretically, starts or stops the movement of motor 1. Motor control register 17 has no influence on the speed of motor 1, but does have an influence on the direction of rotation. The contents of cycle time register 13 influences the ripple of the motor current with, particularly, the influence of cycle time counter 12.

Figure 7:
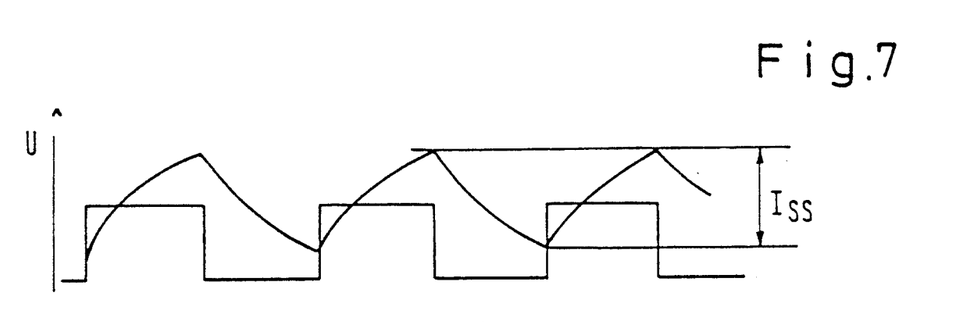
FIG. 7 is a graph of the motor current which is superimposed on a pulse modulated signal under ordinary conditions.

In FIG. 7, the rectangular wave motor voltage is plotted over the time, with the ascending and descending motor current, Iss, superimposed thereon. The value of current Iss is determined by the electrical time constants of motor 1.

Figure 8:
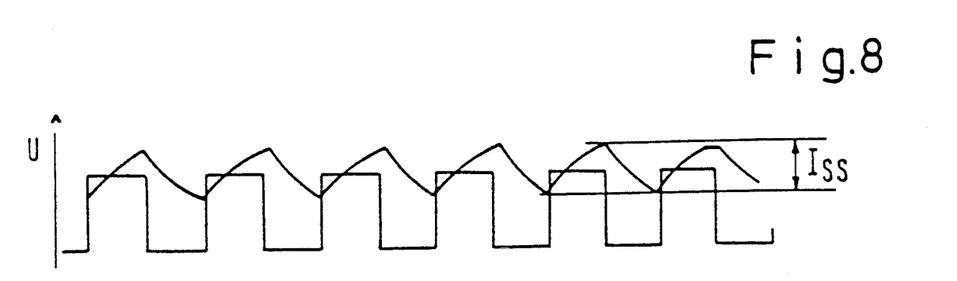
FIG. 8 is a graph of the motor current which is superimposed on a double frequency pulse modulated signal.

FIG. 8 shows motor current Iss at double the clock pulse frequency. The motor voltage takes on approximately the same average value, and the motor current peaks are smaller. Such smaller peaks represent more of a direct current characteristic than the peaks shown in FIG. 7. However, the average voltage of the rectangular waves in both FIGS. 7 and 8 are approximately equal. This is of major importance for speed regulation. However, the contents of cycle time register 13 cannot be too small, since that could cause excessive switching losses in the final stage drivers. The limit frequency of the drivers must therefore also be carefully considered.

The content of cycle time register 13 has a determining influence on the action of the control variables of pulse time register 18. The following is an example. If cycle time register 13 equals 300 microseconds and pulse time register 18 equals 100 microseconds, Uaverage equals $\frac{2}{3}$ Umax. If cycle time register 13 equals 200 microseconds and pulse time register 18 equals 100 microseconds, then Uaverage equals $\frac{1}{2}$ Umax.

Therefore, since contents of pulse time register 18 are equal in both instances, different output voltages occur. By varying both the contents of cycle time register 13 and pulse time register 18, there are, theoretically, an infinite number of numerical combinations to achieve a defined output voltage. With the contents of cycle time register 13 being fixed, however, there exists only one single possibility for any given pulse or pause time.

The content of the pulse time register 18 represents the actual control variable. The control variable limits may range from zero to the value of cycle time register 13. The control algorithm, which calculates the pulse or pause time register 18 is written based on a function of several factors. These are the desired speed, the content of cycle time register 13, the desired precision and control speed, the arithmetic routines available, the allowed computer time, and external, ambient factors such as disturbances.

The control algorithms for the embodiment described above are based on the following considerations.

The "off"-time determination for the controlled system proceeds from the assumption, theoretically, that there are no disturbances and the load conditions are constant. On that basis, for a desired speed, a value of pulse time register 18 fitting the cycle time register 13 can be found, by means of which, in controlled operation, it is possible to maintain the specified speed in controlled operation merely with a simple specification for cycle time register 13 and pulse time register 18 can be obeyed, without feedback from the coder 3. These basic "off" times must be determined for each speed. This determination can be made by practical tests, in which the cycle time = desired time is specified, and the pulse time changed until the required setpoint (speed) is reached. Since this is a linear system, it is sufficient to perform this "off" time determination for a few speeds and to determine the linear equation for the system from the results. The result then reads:

"Off"-time = (a times desired time +b) +I. where:
a = the slope of the lines, and
b = the intersection with the ordinate (b is the time which is set at Umax).
I = integral part,
P = proportional part.

The precision with which this equation can be realized by software is a function of the arithmetic routines available and the computer time allowed. However, a good approximation will suffice, since the control variable fluctuates around this "off" time, and in addition to load fluctuations, errors can be compensated for in the calculation of the basic "off" time.

For the "off" time determination, the cycle time = the desired time. At slow speeds in particular, however, this process would lead to excessive cycle times and thus to large current fluctuations. That would negate the major advantage of the hardware support. Therefore, the cycle time is set on the basis of the following historical values: At corresponding set times per 1/120 inches from 200 to 3000 microseconds, values between 100 and 400 microseconds result for the cycle time. The ratio of cycle time/desired time is designated as z.

In the application described above, a proportional-integral regulation system is realized, which operates according to the following equation: Control variable (pulse time register) = ("off" time +P +I) times z, where z may be a z transform which is well known in the prior art.

The regulation is interrupt controlled, i.e. an interrupt is produced in the current program by the hardware for each slot in the slotted disc 3a. In this interrupt, the elapsed time since the last interrupt is measured, and the new control variable is calculated from it. To measure the elapsed time, a time element is used, which is integrated in the microprocessor 5.

The following parameters are significant: The calculation of the basic "off" time was described above. As soon as this "off" time, when there are disturbances, does not lead to the desired speed, the P and I portions come into play.

The P-portion (proportional part) is combined of error times k, where k is proportionably constant. Error =specified time minus actual time. Specified time may also be termed as desired time or target.

The amplification factor k takes care of the appropriate weighting of the proportional part and thereby prevents unstable conditions, e.g. oscillations.

The P-portion is responsible for the rapid compensation of large speed differences, e.g. as they occur in particular during acceleration and deceleration. When there are major load fluctuations and incorrectly calculated basic "off" times, however, there are certain limits to the precision of the P-regulator.

On the other hand, the integral portion takes care of long-term precision of the regulator even in the presence of long-term load changes, like those which can always be expected in mass-produced products.

The I-portion starts with the value 0 and increases/-decreases; as a function of positive/negative error in each interrupt, Ioffset "is determined like k, by tests, around the value Ioffset:

| $I = I +/- $ Ioffset | |
|---|---|
| Specified time | I-offset |
| 200–1023 μs | 0.5 μs |
| 1024–1535 μs | 1 μs |
| 1536–2303 μs | 2 μs |
| 2304–3071 μs | 3 μs |

In this application, the movement of the motor is very frequently started with different specified speeds, and is then stopped. When disturbances are present, therefore, the I-portion must be modified for each operation as a function of conditions. To keep these control activities to a minimum, a special method is used. As soon as the actual speed is in the tolerance range of the specified speed, the current I-value is stored in memory. If the movement is started once again with the same specified speed, then this last I-value is added to the previously calculated basic "off" time. The result is the above-mentioned equation for the calculation of the basic "off" time.

An advantageous method for the deceleration of the electric motor 1 consists of short-circuiting it, and has previously been used even without the above-mentioned hardware support. However, this deceleration method requires that the braking distance available must be sufficient to bring the electric motor 1 to a stop using the short-circuit method.

On the other hand, it is also possible to reverse the polarity of the current to the electric motor 1, i.e. to reverse the current to the motor. If the maximum voltage Umax is used, however, very large current peaks must be expected, which in extreme cases can lead to the destruction of the driver.

The hardware support now represents an advantageous instrument, in the form of the above-mentioned register, to cycle the motor voltage in a desired ratio, and thus to keep the motor current within allowable limits with minimal software effort and expense when the polarity is reversed. Since the braking action of electric motor 1 is affected by external factors, e.g. inertia, coefficients of friction, temperature etc. even when there are reverse currents, the determination of the control variables of the pulse time, of pulse time register 18, can be made completely according to regulating algorithms, if necessary.

Thus, the present invention provides an adaptive control system whereby the speed of motor 1 is monitored and future voltage values to be applied to motor 1 are calculated. Because of limitations in the CPU, a PCU is provided to selectively apply the voltage to motor 1 as instructed by the CPU.

In summing up, one aspect of the invention resides broadly in an apparatus for regulating the speed of pulse width modulated electric motors, in particular of direct current motors. On the shaft of the electric motor, there is a coder, whose signals are used as feedback signals in the regulation circuit and are transmitted to a regulator with a microprocessor, from the output control lines to an amplifier, and the amplifier feeds the electric motor. The regulator 4 comprises a microprocessor 5 connected to the coder 3, and the microprocessor 5 is connected by a data and address bus 9 to a peripheral control component 10. The microprocessor 5 can be loaded by the data and address bus 9 with programs 11 for regulating the "off" time of the pulse curve. The peripheral control component 10 has a binary cycle time counter 12, a cycle time register 13 and a cycle time comparator 14, whereby when the defined counter status is achieved, an output signal (MH1, MH2) can be produced by a control logic (15/1 or 15/2). A toggle flip-flop 16 located in the control logic 15 activates the direct current motor 1 with a reversing flow, the frequency of which is in the audible range, so that the direct current motor 1 acts as an acoustical signalling device. By the use of a motor control register 17, the output signal (Mh1, Mh2) is reversible, i.e. the direct current motor 1 can be reversed, and the motor voltage timed to influence the deceleration of the direct current motor 1 in a controllable ratio.

When conducting the test for a determination of the various parameters needed to properly control the motor, the initial test for determining "off" time includes the integral part I but does not tend to include the proportional part P. Since the initial determination through practical testing is performed at various constant speeds below the maximum speed, only the integral part I, which is characteristic of the particular installation, would influence the initial determination of the formulas for "off" time. When "off" time is determined through these practical tests, the value of the integral part is present in order to provide an accurate adjustment factor for the particular installation.

However, it has been found that for some cycle times, the "off" time at relatively slow speeds has resulted in large current fluctuations. Accordingly, additional testing at various cycle times, for example, between 100 and 400 microseconds, has produced different "off" times which are capable of being utilized with less current fluctuations for a better overall operation of the motor. Generally, these individual cycle times are compared to the desired cycle time in a ratio indicated by the factor z. Accordingly, the factor z can be utilized to adjust the control variable which is sent to the pulse time register 18. Accordingly, the control variable is a sum of the "off" time, the proportional part and the integral part which are multiplied by the factor z. It should be noted that the proportional part and the integral part may be positive or negative values. For example, during acceleration and/or deceleration, the proportional part may be positive or negative. Additionally, the integral part may be positive or negative depending on various parameters of the overall system during manufacture.

As thus described, when using the appropriate "off" time which speed of the motor as determined by the coder should be relatively close to the desired speed as determined through the testing. However, during acceleration and deceleration, there will clearly be an indication through the coder and the microprocessor 5, that the actual speed of the motor does not directly correspond to the desired speed as reflected by the "off" time (and thus the control variable) as basically provided to the pulse time register 18. Accordingly, the coder will indicate through elapsed time information to the microprocessor, that there is an error which tends to reflect the P-portion (proportional part) to indicate that adjustments to the control variable being sent to the pulse time register 18 are required. However, directly applying the proportional part error to the control variable of the pulse time register 18 would result in an unstable condition causing oscillation. Therefore, the preferred microprocessor 5 includes an error factor k to reduce the indication of the actual difference between the specified time and the actual time in order to prevent such oscillations. However, with a properly modified indication of the difference between the specified time and the actual time, the resulting adjusted P-portion is capable of rapid compensation of large speed differences resulting from acceleration and deceleration. It should be noted that each of these determinations of the P-portion can be made for each interruption at each slot of the slotted disk 3a by the coder 3 so that rapid changes of the control variable to the pulse time register 18 can be made.

Accordingly, for example, when accelerating, the P-portion (proportional part) will indicate that the control variable must be. increased because of the failure of the motor to be moving at the desired speed as indicated to the pulse time register. A rapid adjustment to the control variable to the pulse time register will quickly compensate for the required acceleration. Still further, as the desired speed is being reached the proportional part will rapidly decrease in order to allow the control variable being sent to the pulse time register 18 to be returned to the theoretical value which includes the integral portion indicative of the various inherent factors in the overall system.

As thus described, it would appear that the proper utilization of the proportional part through actual speed indication by the coder 3 would tend to result in the desired operation throughout acceleration and deceleration. However, it has also been found through testing and analysis that some adjustments to the integral part I should be made depending on the desired speed of the motor.

Consequently, the Ioffset, as discussed above, has been utilized to provide minor adjustments to the general "off" time calculations during the various slot times as indicated.

With the factors being utilized through the microprocessor as discussed hereinabove, it is clear that in some cases, for rapid deceleration of the motor (tending to produce a large proportional part), simple short circuiting of the motor may not be sufficient to bring the motor to a rapid stop. Accordingly, the microprocessor 5 may utilize information from the coder 3 indicating a large P-portion when there is failure to properly decelerate to produce momentary reverse polarity to the motor to further insure proper deceleration. However, as indicated above, reversing the polarity in this manner should be properly controlled by the microprocessor to prevent very large current peaks which could tend to damage the motor.

Figure 9:
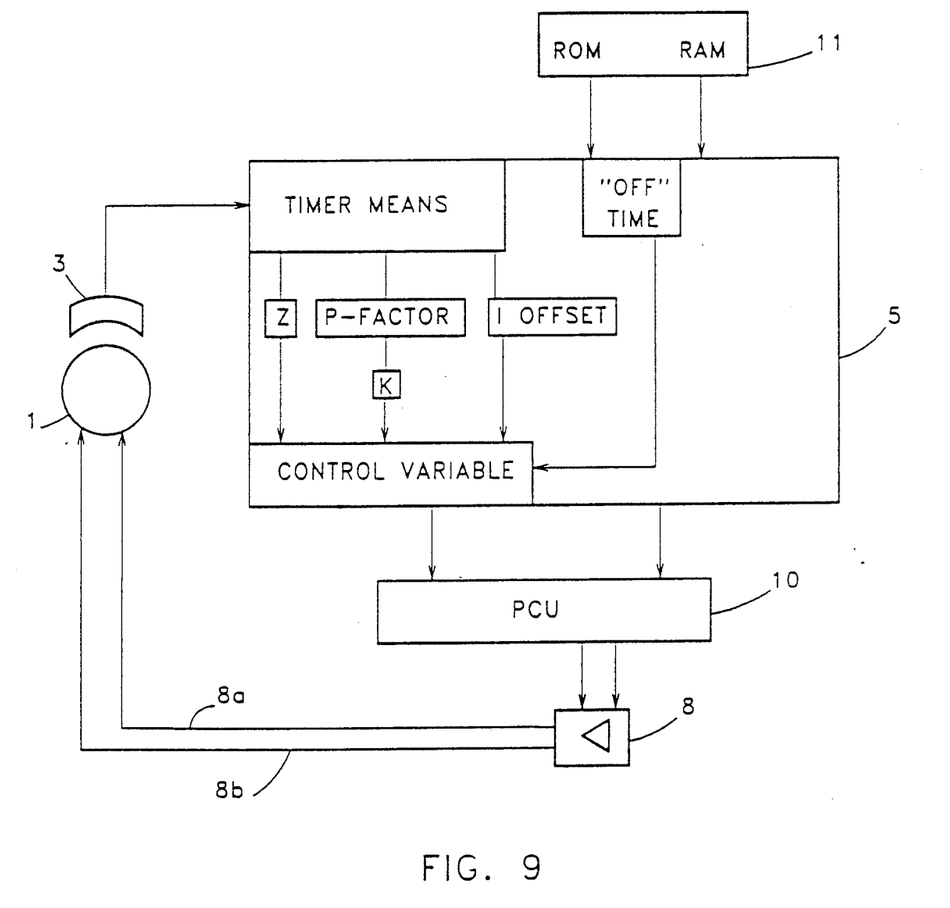
FIG. 9 is a schematic diagram of a preferred control system for the motor including various features of the invention.

From the discussion above, it should be clear, as seen in FIG. 9 in schematic form, that the preferred invention can include numerous factors to affect the overall operation and control of the motor 1. The software program 11 is basically utilized to provide a speed request information for the operation of the overall printing machine to the microprocessor 5. This information can result in a basic "off" time for each desired speed which is determined in the manner as discussed hereinabove. Additionally, depending on the particular speed of the motor 1, the coder 3 will indicate actual speed to a timer means within the microprocessor 5. The information from the timer means can result in the determination of the factor z, depending on the preferred cycle time to be used. Additionally, the timing means can be employed to determine the overall P-factor which is indicative of the actual speed when compared to the desired speed and then adjust the P-factor by the factor k. Still further, the timing means can be utilized to determine the $I_{offset}$ which is again varied according to the actual speed of the motor. These factors are all applied in the determination of the "off" time to produce the specific control variable which is then provided to the pulse time register 18 of the peripheral control component 10. Clearly, additional information from the software 11 is also provided through the microprocessor 5 to the peripheral control component 10 in order to provide overall control of the motor 1 through the amplifier 8.

Examples of adaptive control systems include U.S. Pat. Nos. 3,601,588; 3,767,900; 3,795,799; 3,876,871; 3,920,965; and 4,197,576.

Examples of microcomputers may be found in U.S. Pat. Nos. 4,794,558; 4,777,609: 4,558,601; and 4,290,106.

Examples of central processing units may be found in U.S. Pat. Nos. 4,794,558; 4,821,182; 4,488,257; 4,797,808; and 4,271,481.

Examples of random access memories may be found in U.S. Pat. Nos. 4,794,558; 4,821,182; 4,797,808; and 4,271,481.

Examples of buses may be found in U.S. Pat. Nos. 4,821,182; 4,488,257; and 4,677,318.

Examples of read only memories may be found in U.S. Pat. Nos. 4,821,182; 4,797,808; and 4,271,481.

Examples of clocks may be found in U.S. Pat. Nos. 4,821,182; 4,820,962; 3,971,972; and 4,677,318.

Examples of logic circuits may be found in U.S. Pat. Nos. 4,488,257; 4,677,318; and 4,829,473.

Examples of registers may be found in U.S. Pat. Nos. 4,797,808; 4,724,517; 4,820,962; 4,807,264; 4,771,223; and 4,190,860.

Examples of chips may be found in U.S. Pat. Nos. 4,797,808; 4,724,517; and 4,271,481.

Examples of memory may be found in U.S. Pat. Nos. 4,724,517 and 4,290,106.

Examples of arithmetic/logic units may be found in U.S. Pat. No. 4,797,808.

Examples of counters may be found in U.S. Pat. Nos. 4,820,962; 4,807,264; 4,724,366; 4,346,434; and 4,190,860.

Examples of motor drives may be found in U.S. Pat. No. 4,820,962.

Examples of chips may be found in U.S. Pat. Nos, 4,797,808; 4,724,517; and 4,271,481.

Examples of memory may be found in U.S. Pat. Nos. 4,724,517 and 4,290,106.

Examples of arithmetic/logic units may be found in U.S. Pat. No. 4,797,808.

Examples of counters may be found in U.S. Pat. Nos. 4,820,962; 4,807,264; 4,724,366; 4,346,434; and 4,190,860.

Examples of motor drives may be found in U.S. Pat. No. 4,820,962.

Examples of pulses may be found in U.S. Pat. Nos. 4,807,264; 4,771,223; 4,724,366; and 4,346,434.

Examples of motors may be found in U.S. Pat. Nos. 4,807,264; 4,724,366; 4,346,434; 4,190,860; 4,833,375; and 3,971,972.

Examples of motor speed control may be found in U.S. Pat. No. 4,771,223.

Examples of gates may be found in U.S. Pat. No. 4,724,366.

Examples of shift registers may be found in U.S. Pat. No. 4,818,127.

Examples of print elements may be found in U.S. Pat. Nos. 4,818,127 and 4,591,280.

Examples of dot matrix printers may be found in U.S. Pat. Nos. 4,764,040 and 4,591,280.

Examples of printers may be found in U.S. Pat. No. 4,650,358.

Examples of motors for printing elements may be found in U.S. Pat. No. 4,461,984.

Examples of optical detectors may be found in U.S. Pat. No. 4,446,367.

Examples of motors for printers may be found in U.S. Pat. No. 4,387,642.

Examples of rotary linear shuttles for a printer may be found in U.S. Pat. No. 4,353,262.

Examples of motor shuttles for a print head may be found in U.S. Pat. No. 4,461,984.

Examples of duty cycle pulse width modulation timing pulses may be found in U.S. Pat. Nos. 4,242,619; 4,833,375; and 4,804,864.

Examples of flip-flops may be found in U.S. Pat. Nos. 4,833,375; 4,804,864; 4,677,318 and 4,313,206.

Examples of comparators may be found in U.S. Pat. No. 3,971,972.

Examples of toggling may be found in U.S. Pat. Nos. 4,804,864 and 4,677,318.

Examples of control gates may be found in U.S. Pat. No. 4,804,864.

Examples of set point may be found in U.S. Pat. No. 4,736,091.

Examples of feedback may be found in U.S. Pat. No. 4,677,318.

Examples of print heads may be found in U.S. Pat. No. 4,777,609.

Examples of optical encoders may be found in U.S. Pat. No. 4,558,601.

Examples of peripheral control circuits may be found in U.S. Pat. No. 4,829,473.

Examples of control logic registers may be found in U.S. Pat. Nos. 4,379,328 and 4,348,743.

Examples of pulse width measurement and modulation may be found in U.S. Pat. No. 4,348,743.

Examples of address may be found in U.S. Pat. No. 4,290,106.

Examples of voltage comparators can be found on pages 5-24, 5-37, 5-53, 5-48 and 5-49 in "Linear Data Book", published by National Semiconductor Corp. (1976) for Radio Shack. Analog to digital and digital to analog comparators can be found on pages 8-12 through 8-17 in "Linear Data Book", published by National Semiconductor Corp. (1976) for Radio Shack.

All of the patents, patent applications, and publications recited herein are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. A microprocessor computer control for a printer such as a printer for a personal computer or the like, said microprocessor computer control being for regulating the speed of pulse width modulated electric motors, in particular of direct current motors, said microprocessor computer control comprising:

coder means on the motor for providing signals which are used as feedback signals in a regulation circuit and are transmitted to a regulator with a microprocessor;

output control lines from said regulator to an amplifier which feeds the electric motor;

the regulator comprising a microprocessor connected to the coder means;

the microprocessor being connected by means of a data and address bus to a peripheral control component; and pulse curve;

the microprocessor being loaded by means of the data and address bus with programs for regulating the "off" time of the pulse curve;

the regulator further comprising a peripheral control unit;

said peripheral control unit having at least a first memory register and a second memory register, said first memory register comprising cycle time memory means for storing a first data value indicative of a cycle time, and said second memory register comprising pulse time memory means for storing a second data value indicative of a pulse time, said cycle time being a selected period of time for the pulse width modulation of the electric motor, and said pulse time being a portion of said cycle time during which the electric motor is to be supplied with a driving voltage;

said peripheral control unit further comprising logic circuitry means for supplying the amplifier with a pulsed voltage having a cycle time substantially equal to the cycle time indicated by said cycle time register and a pulse time portion thereof substantially equal to the pulse time indicated by said pulse time register; and said microprocessor comprising means for accessing software through said data bus and for loading said cycle time register and said pulse time register of said peripheral control unit with values indicated by the accessed software.

2. The microprocessor computer control according to claim 1, wherein the peripheral control component has a binary cycle time counter, a cycle time register and a cycle time comparator, whereby when the defined counter status is achieved, an output signal can be produced by means of a control logic.

3. The microprocessor computer control according to claim 1, further including a toggle flip-flop located in a control logic which activates the direct current motor with a reversing flow, the frequency of which is in the audible range, so that the direct current motor acts as an acoustical signalling device.

4. The microprocessor computer control according to claim 3, further including a motor control register for providing the output signal which is reversible to cause the direct current motor to be reversed, and means for timing the motor voltage to influence the deceleration of the direct current motor in a controllable ratio.

5. A printer for a personal computer or the like, said printer comprising:
a printer head,
motor means for moving said printer head in a preselected direction,
said motor means including a plurality of input terminals,
regulator means for regulating the supply of power to said motor means,
an amplifier connected between said regulator means and said motor means input terminals for supplying power to said motor means for moving said printer head at a preselected speed in a preselected direction,
conductor means for connecting said regulator means through said amplifier to said motor means input terminals,
coder means for sensing the speed of said motor means and for generating a feedback signal to said regulator means proportional to the speed of said motor means,
said regulator means including a microprocessor for setting the speed of said motor means at a preselected speed represented by a preset signal,
said microprocessor being connected to said coder means for receiving said feedback signal and for comparing said feedback signal being proportional to the speed of said motor means with said preset signal representing the preselected speed of said motor means,
a peripheral control unit connected to said microprocessor for receiving an output signal from said microprocessor in response to said feedback signal received by said microprocessor,
said peripheral control unit being responsive to said output signal from said microprocessor to generate a responsive signal for actuating said amplifier to control said motor means for moving the printer at the preselected speed in the preselected direction,
said peripheral control unit being operable to actuate said amplifier to adjust the supply of power to said motor means in the event said feedback signal deviates from said preset signal, to thereby maintain said motor means at said preselected speed,
said peripheral control unit having a first memory register for storing a first value indicative of a cycle time, said first value indicative of said cycle time being supplied to said peripheral control unit by said microprocessor, said peripheral control unit also having a second memory register for storing a second value indicative of a pulse time, said second value indicative of a pulse time also being supplied to said peripheral control unit by said microprocessor,
said pulse time being at least a portion of said cycle time,
said peripheral control unit having logic means for driving said motor means, through said amplifier, in increments of time substantially equal to said cycle time,
said peripheral control unit also having logic means for driving said motor means, through said amplifier, such that, during each of said cycle times, said motor is supplied with an actuating voltage for a period of time which is proportional to said pulse time and, during the remainder of each of said cycle times, said motor is supplied with a substantially nonactuating voltage, and
said printer also comprising program memory storage means for storing program data for the determination of said cycle time and said pulse time, and data bus means for supplying said program data to said microprocessor, and wherein at least a portion of said program memory storage means comprises read only memory (ROM).

6. The printer according to claim 5, wherein said regulator means further includes:
a program for supplying input data to said microprocessor for setting the preselected speed of said motor means, and
said microprocessor including a first data bus and a second data bus,
said first data bus receiving said input data,
said second data bus connecting said microprocessor to said peripheral control unit for transmitting said output signal to said peripheral control unit in response to said input data supplied to said microprocessor.

7. The printer according to claim 5, further including:
said motor means including a direct current motor,
said peripheral control unit including control logic means for controlling the supply of direct current to said direct current motor, and
said control logic means including a toggle flip-flop for reversing the direction of current flow to said direct current motor.

8. The printer according to claim 7, further including:
said control logic means operable to supply direct current to said direct current motor at a preselected frequency in the audible range to actuate said direct current motor as an acoustical signalling device.

9. The printer according to claim 5, wherein the peripheral control unit includes:
said peripheral control unit generating said responsive signal as a pulsed voltage signal having a preselected maximum voltage and a preselected cycle time,
first register means for setting said preselected cycle time of said pulsed voltage signal,
second register means for establishing an off time of said pulsed voltage signal in response to said output signal from said microprocessor, and
comparator means for comparing the cycle time of said pulsed voltage signal with said preselected cycle time to maintain the cycle time at a preselected value.

10. The printer according to claim 5, wherein the peripheral control unit includes:
register means for controlling the direction of rotation of said motor means by generating a first responsive signal in a first direction and a second responsive signal in a second direction where said second direction is opposite to said first direction so that the direction of rotation of said motor means is reversed.

11. The printer according to claim 5, wherein the peripheral control unit includes:
means for controlling said responsive signal supplied by said peripheral control unit to said amplifier to adjust the rate of speed said motor means moves said printer head.

12. A printer for a personal computer or the like, said printer comprising:
a printer head, motor means for moving said printer head in a preselected direction, said motor means including a direct current motor, said motor means including a plurality of input terminals, regulator means for regulating the supply of power to said motor means, an amplifier connected between said regulator means and said motor means input terminals for supplying power to said motor means for moving said printer head at a preselected speed in a preselected direction, conductor means for connecting said regulator means through said amplifier to said motor means input terminals, coder means for sensing the speed of said motor means and generating a feedback signal to aid regulator means proportional to the speed of said motor means, said regulator means including a microprocessor for setting the speed of said motor means at a preselected speed and a program for supplying said microprocessor with input data for setting said preselected speed of said motor means, said microprocessor being connected to said coder means for receiving said feedback signal and comparing said feedback signal being proportional to the speed of said motor means with said preset signal representing the preselected speed of said motor means, a peripheral control unit connected to said microprocessor for receiving an output signal from said microprocessor in response to said feedback signal received by said microprocessor, said peripheral control unit being responsive to said output signal from said microprocessor to generate a responsive signal to said amplifier for actuating said amplifier to control said motor means for moving the printer at the preselected speed in the preselected direction, said peripheral control unit being operable to actuate said amplifier to adjust the supply of power to said motor means in the event said feedback signal deviates from said preset signal, to thereby maintain said motor means at said preselected speed, said microprocessor including a first data bus and a second data bus, said first data bus for receiving said input data from said program, said second data bus connecting said microprocessor to said peripheral control unit for transmitting said output signal to said peripheral control unit in response to said input data supplied to said microprocessor, said peripheral control unit generating said responsive signal as a pulsed voltage signal having a preselected maximum voltage and a preselected cycle time.

first register means for setting said preselected cycle time of said pulsed voltage signal, second register means for establishing an off time of said pulsed voltage signal in response to said output signal from said microprocessor, comparator means for comparing the cycle time of said pulsed voltage signal with said preselected cycle time to maintain the cycle time at a preselected value, and said microprocessor being loaded with programmable data from said first data bus with programs for regulating said off time of said voltage signal.

13. The printer according to claim 12, further including:

said peripheral control unit including control logic means for controlling the supply of direct current to said direct current motor, and said control logic means including a toggle flip-flop for reversing the direction of current flow to said direct current motor.

14. The printer according to claim 13, further including;

said peripheral control unit including counting means being incremented by a first clock pulse signal, said comparator means for generating a second clock pulse signal upon said counting means reaching the same value as said first register means, and said second clock pulse signal for resetting said toggle flip-flop.

15. The printer of claim 14, further including:

said cycle time corresponding to a period T, said off time being represented in said second register means by a control variable, comparison register means for receiving a pause signal from said second register means at the beginning of each said period T where said pause signal corresponds to said control variable, and time comparator means for setting said toggle flip-flop upon said counting means reaching the same value as said comparison register means.

16. The printer of claim 15, further including:

said coder means comprising a slotted disc comprising a plurality of slots, said slotted disc generating data representative of the degree of displacement of said printer head, and each of said plurality of slots substantially corresponding to a displacement of 1/20 inch of said print head.

17. The printer of claim 16, wherein said preselected speed of said motor means is between about 200 microseconds to 3000 microseconds per 1/120 inch of displacement of said printer head.

18. The printer of claim 17, further including a control algorithm for calculating said control variable.

19. The printer of claim 18, further including:

said slotted disc generating an interrupt in said control algorithm for each said slot, where said interrupt is a measurement of elapsed time since previous interrupt and permits calculating said control variable.

20. The printer of claim 19, further including:

a basic off time corresponding to said preset speed, said basic off time being determined by testing, said cycle time being between about 100 to 400 microseconds, a preset cycle time corresponding to said preset speed where the ratio of said cycle time to said preset cycle time corresponds to a variable z, said variable z being a z transform, said control variable comprising a proportional variable P and an integral variable I, said proportional variable P comprising an error variable and a constant K, said error variable corresponding to said preset cycle time minus said cycle time, said constant K being an amplification factor for weighting said proportional variable P, said proportional variable P compensating for large speed differences of said motor means, said integral variable I being variable as a function of error in each said interrupt, and said basic off time being modified by said integral variable I in subsequent operation of said printer.

* * * * *

UNITED STATES PATENT AND TRADEMARK OFFICE
CERTIFICATE OF CORRECTION

PATENT NO. : 5,065,341

DATED : November 12, 1991

INVENTOR(S) : Manfred GRUNER and Heiko KUNZE

It is certified that error appears in the above-identified patent and that said Letters Patent is hereby corrected as shown below:

In column 1, line 50, after 'An', delete "abject" and insert --object--.

In column 4, line 7, delete ".as" and insert --as--.

In column 4, line 68, after 'max,', insert --under--.

In column 6, line 13, after 'speed', delete ":" and insert --.--.

In column 7, line 13, after 'Ioffset', delete " "is " and insert --is--.

In column 8, line 62, after 'which', insert --includes the integral part and as adjusted for various cycle times, the--.

In column 9, line 27, after 'the', delete "-.

In column 9, line 27, after 'be', delete -- . --.

Col. 12, in Claim 1, line 17, after 'and', delete "pulse curve;".

Col. 15, in Claim 12, line 20, after 'to', delete "aid" and insert --said--.

Col. 15, in Claim 12, line 61, delete "time." and insert --time,--.

UNITED STATES PATENT AND TRADEMARK OFFICE
CERTIFICATE OF CORRECTION

PATENT NO. : 5,065,341

DATED : November 12, 1991

INVENTOR(S) : Manfred GRÜNER and Heiko KUNZE

It is certified that error appears in the above-identified patent and that said Letters Patent is hereby corrected as shown below:

Column 16:
    In Claim 16, line 7, after the first instance of 'of', delete "1/20" and insert --1/120--.
    In Claim 20, line 13, after 'constant', delete "K," and insert --k,--.
    In Claim 20, line 16, after 'constant', delete "K" and insert --k--.

Signed and Sealed this

Thirteenth Day of April, 1993

*Attest:*

STEPHEN G. KUNIN

*Attesting Officer*      *Acting Commissioner of Patents and Trademarks*